US006270043B1

(12) United States Patent
Alfrey

(10) Patent No.: US 6,270,043 B1
(45) Date of Patent: Aug. 7, 2001

(54) ROOF MOUNTED MAST SUPPORT

(75) Inventor: David Alvin Alfrey, Studio City, CA (US)

(73) Assignee: PTMW, Incorporated, Meriden, KS (US)

( * ) Notice: Subject to any disclaimer, the term of this patent is extended or adjusted under 35 U.S.C. 154(b) by 0 days.

(21) Appl. No.: 09/245,528

(22) Filed: Feb. 5, 1999

(51) Int. Cl.[7] .................................................... F16M 11/00

(52) U.S. Cl. ......................... 248/200; 248/536; 248/48.1; 52/296; 52/726.3; 52/726.4

(58) Field of Search .................................... 248/200, 237, 248/220.21, 220.41, 536, 48.1; 343/892, 878; 52/27, 296, 726.3, 726.4

(56) References Cited

U.S. PATENT DOCUMENTS 2,496,938 * 2/1950 Friedman ............................... 174/84
4,989,826 * 2/1991 Johnston, Jr. ......................... 248/676
5,011,106 * 4/1991 Cody .................................... 248/237
5,517,204 * 5/1996 Murakoshi et al. ................. 343/765
5,617,680 * 4/1997 Beatty .............................. 343/674 X
5,647,567 * 7/1997 Pugh, Jr. et al. .................... 248/237
5,873,201 * 2/1999 Fey .................................. 248/237 X

* cited by examiner

*Primary Examiner*—Leslie A. Braun
*Assistant Examiner*—A. Joseph Wujciak
(74) *Attorney, Agent, or Firm*—Shook, Hardy & Bacon LLP

(57) ABSTRACT

A device for mounting a structure to the roof of a building, the device comprising a base plate removably secured to the building roof, the base plate having an upper planar surface and a lower planar surface; a standoff comprising an elongated housing which extends outwardly away from said roof and presents a bottom planar surface being removably secured to the roof, and a top planar surface parallel to and remote from the bottom planar surface; and a structure presenting a planar mounting surface extending radially from the structure, wherein the mounting surface being parallel to and spaced from the top planar surface and further being removably secured to the top planar surface; wherein the mounting surface and the top planar surface are adapted to receive a first locking device for removably securing the mounting surface to the top planar surface; and wherein the roof, the base plate, and the bottom planar surface are adapted to receive a second locking device.

9 Claims, 2 Drawing Sheets

Fig.4.
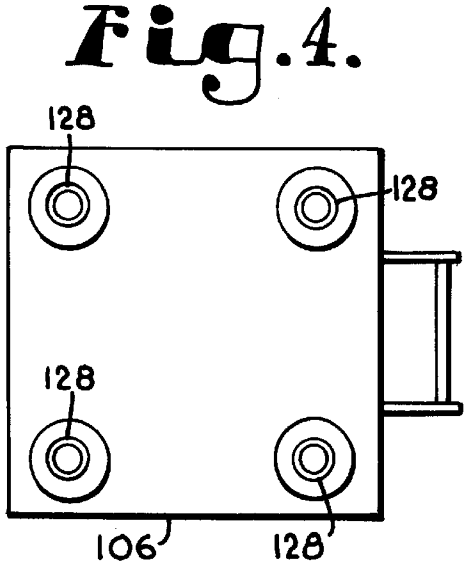
Fig.5.
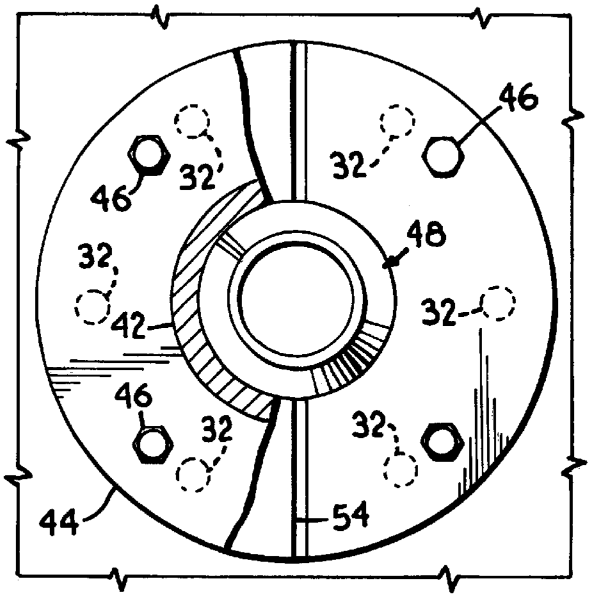
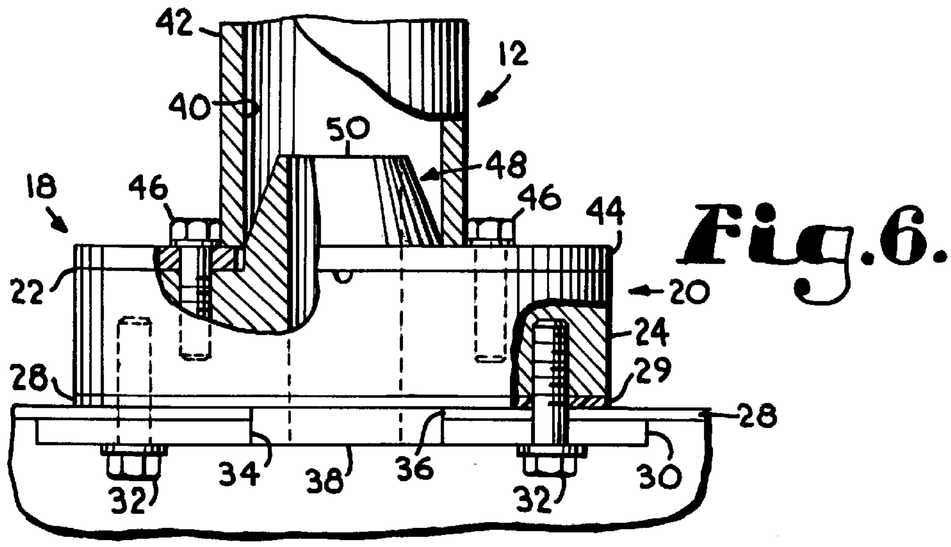
Fig.6.

ROOF MOUNTED MAST SUPPORT

BACKGROUND OF THE INVENTION

This invention relates generally to a device for mounting a structure to the roof of a building, and in particular to a device for the remote mounting of a mast, ladder or similar structure to a building such as those used to house railroad switching equipment located alongside railroad tracks.

It is a common practice in the railroad industry to attach ladders, signal lights or other structures to a mast that is mounted to the roof of a building located near railroad tracks. Buildings of this type are generally described in U.S. Pat. No. 5,720,141. In mounting methods known to those skilled in the art, the support structure is mounted directly to the roof of a building. This causes certain problems such as water leakage through the roof and destabilization of the structure as the bolts become worn or as the integrity of the bolt holes deteriorate due to forces acting on the mast, such as wind and rain.

The mounting device of the present invention addresses these and other limitations of the prior art by mounting the mast support to an intermediate support structure rather than directly to the roof of the building.

SUMMARY OF THE INVENTION

The present invention is directed to an improved device for mounting a mast support or similar structure to the roof a building. The invention overcomes the problem set forth above by mounting the mast support to the roof of the building via an intermediate housing or standoff This eliminates the need to bolt or otherwise secure the mast support directly to the housing. The upper surface of the standoff includes a conical extension that serves to guide the mast structure into proper alignment with the device.

The mounting device generally comprises a unitary structure having a bottom plate which is removably attachable to the roof of the building, a top plate to which the mast support is removably attachable, a lower housing extension which is received within an aperture in the roof of the building, and a frustoconical extension of the housing receivable in a recess in the mast. The conical extension guides the mast support structure into proper positioning with the device. A mounting plate is welded to the bottom edge of the mast structure and is removably attachable to the top plate of the device by a series of threaded bolts. The top plate of the device further includes a series of drainage channels or grooves which guide rain and other moisture away the mast support structure thereby reducing deterioration of the device.

Accordingly, it is an object of the present invention to provide a mounting device that allows a mast or support structure to be remotely secured to the roof of a building.

Another object of the present invention is to provide a mounting device that is formed of a single cast piece that is removably attachable to the roof of a building to which a mast support can be removably attached.

Another object of the present invention is to provide a device that includes a frustoconical section that guides the mast during installation to the device.

A further object of the present invention is to provide a mounting device that prevents the accumulation of moisture on the support structure.

Additional objects, advantages and novel features of this invention will be set forth in part in the description that follows, and in part will become apparent to those skilled in the art upon examination of the following, or may be learned by practicing the invention.

BRIEF DESCRIPTION OF THE DRAWINGS

In the accompanying drawings which form a part of the specification and are to be read in conjunction therewith and in which like reference numerals are used to indicate like parts in the various views:

FIG. 4 is a bottom view of the mounting plate of the present invention;

FIG. 5 is a top elevational view of the mounting plate of the preferred embodiment of the present invention, showing bolt apertures in the base plate in broken away lines; and FIG. 6 is a side elevational view of the preferred embodiment of the present invention.

DETAILED DESCRIPTION OF THE PREFERRED EMBODIMENTS

Figure 1:
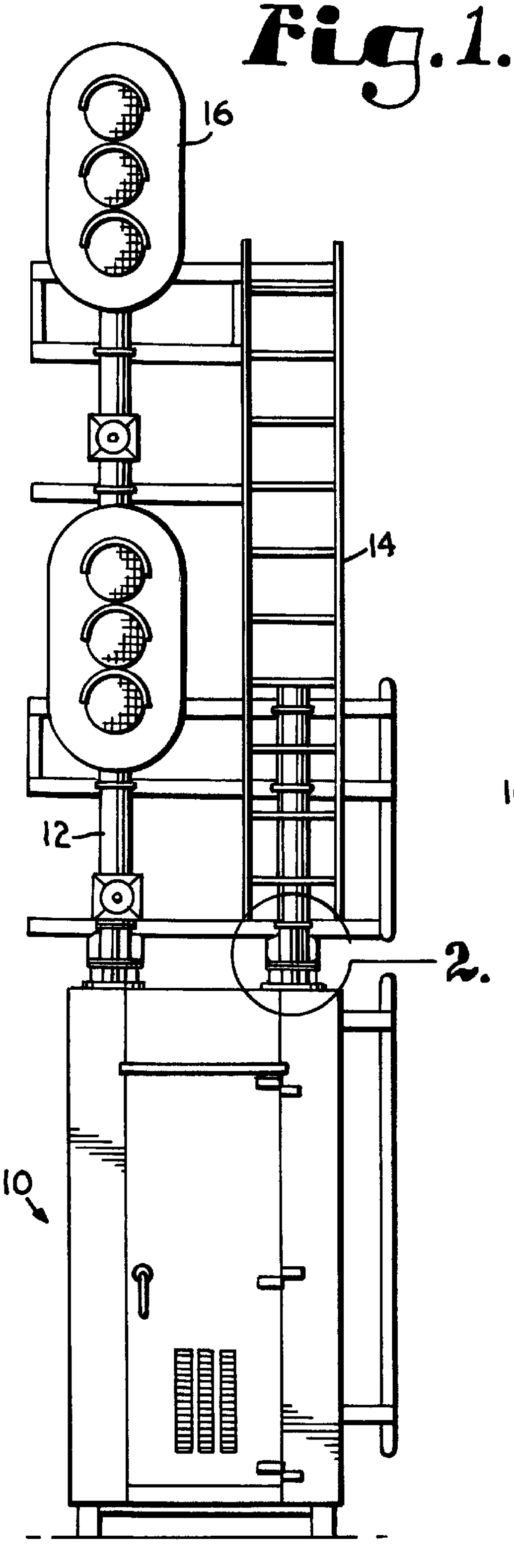
FIG. 1 is a view of a mast and ladder mounted to the roof of a building with the mounting device of the sent invention.

Referring to the drawings in greater detail, FIG. 1 shows the present invention and its relationship to a building 10, a mast support 12, and a ladder 14 as may be used in practice.

Referring to FIGS. 5 and 6, the mounting device of the present invention is generally designated 18 and includes an elongated cast housing 20 having a top plate 22 fixedly secured to an outer wall 24; and a bottom surface 26. Bottom surface 26 communicates with the building roof 28 through an intermediate o-ring seal 29. A support plate 30 is located below roof 28. A plurality of bolt holes are provided in the support plate 30, roof 28 and bottom surface 26. The holes are aligned to receive a corresponding number of bolts 32.

The inner wall 34 of support plate 30 defines an aperture which corresponds to an opening defined by the inner wall 36 of roof 28. An extension 38 of housing 20 extends through roof 28 and beyond support plate 30 into the building. Housing extension 38 is fitted to rest in communication with inner walls 34 and 36.

An inner wall 40 of mast 12 defines an open area. Fixedly attached to the outer wall 42 of mast 12 is a horizontally disposed mounting plate 44. A plurality of holes are arranged about mounting plate 44 and correspond to threaded holes in top plate 22 of the housing. Said holes are adapted to receive a corresponding number of bolts 46 to removably attach the mounting plate to the housing.

The open area of mast 12 receives a frustoconical extension 48 of housing 20. Extension 48 has an upper surface 50 and a beveled outer wall 52 that slopes downwardly to top plate 22. The shape extension 48 facilitates placement of the mast 12 in proper alignment with device 18.

Top plate 22 is generally parallel to roof 28 and includes two channels 54. The upper surface of top plate 22 is sloped to permit moisture that would otherwise accumulate on top plate 22 to flow downwardly to channels 54, away from mast 12 and off the device, thereby preventing the corruption of the device.

Figure 2:
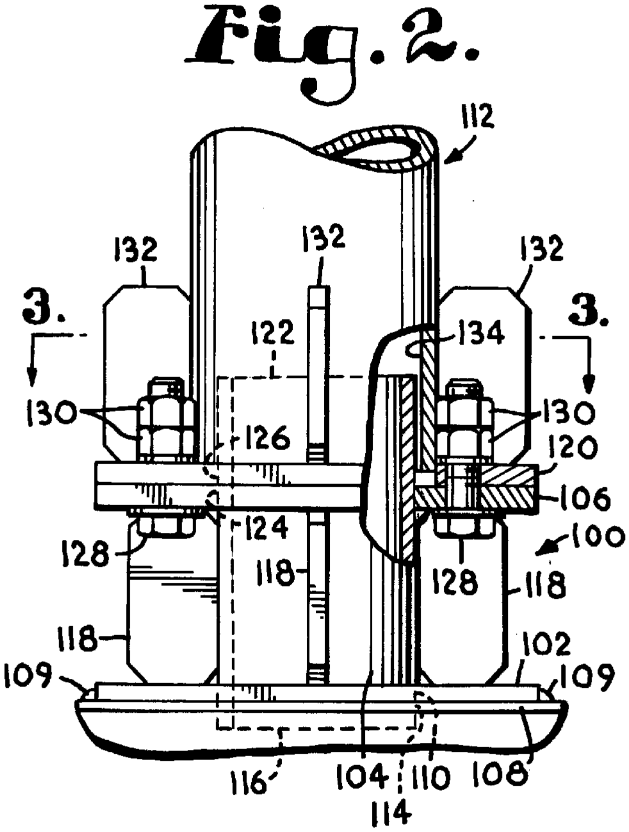
FIG. 2 is a detail area generally shown in circle 2 of FIG. 1.
Figure 3:
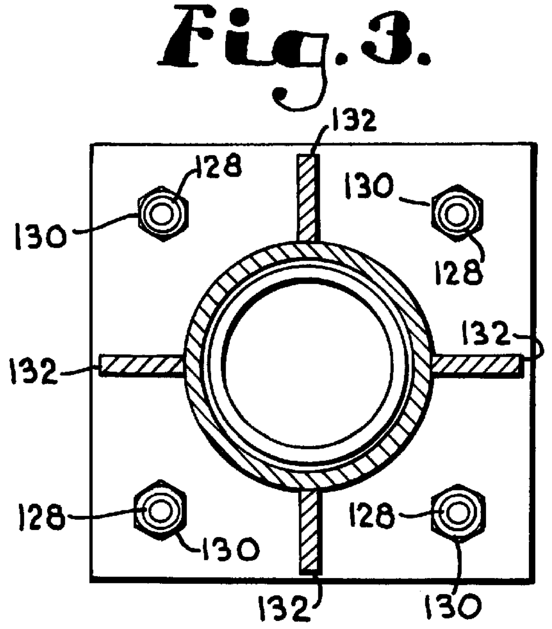
FIG. 3 is a top view of the mounting plate of the present invention taken along line 3–3 of FIG. 2.

FIGS. 2 through 4 show an alternate embodiment of the present invention. The mounting device generally designated 100 includes a base plate 102, an elongated housing 104 and a mounting plate 106. Base plate 102 is welded to the roof 108 of the building as indicated at 109. An arcuate aperture is defined by the inner wall 110 of base plate 102 and corresponds to an arcuate aperture defined by inner wall 114 of the roof 108. An extension 116 of housing 104 protrudes into the building through the aligned apertures in base plate 102 and roof 108.

Plate 106 is integrally connected to the outer wall of housing 104. Mounting plate 120 extends radially from the bottom of mast 112. An upper extension 122 of housing 104 projects through two arcuate apertures defined by the inner wall 124 of mounting plate 106 and the inner wall 126 of mast plate 120. Upper extension 122 communicates with the inner wall 134 of mast 112.

Mounting plate 106 is removably attached to mast plate 120 by a series of bolts. A plurality of bolt holes are arranged in mounting plate 106 and mast plate 120. The bolt holes are adapted to receive a plurality of bolts 128 which extend through mounting plate 106 and mast plate 120 and are secured by nuts 130.

Additional stability and structural strength is provided to the device by a series of gussets. A first set of gussets 118 are fixedly attached to the housing and extend radially therefrom. Gussets 118 extend vertically between the upper surface of base plate 102 in the lower surface of mounting plate 106 and are fixedly attached thereto. A second set of gussets of 132 are rigidly attached to the outer wall of mast 112 and extend vertically to mast plate 120.

From the foregoing it will be seen that this invention is one well adapted to attain all the ends and objects hereinabove set forth together with the other advantages which are obvious or are inherit to the structure.

It will be understood that certain features and subcombinations are of utility and may be employed without reference to other features and subcombinations. This is contemplated by, and is within the scope of, the claims.

Since many possible embodiments may be made of the invention without departing from the scope thereof it is understood that all matter herein set forth or shown in the accompanying drawings is to be interpreted as illustrative, and not in a limiting sense.

I claim:

1. A device for mounting a structure to the roof of a building, said device comprising:

a base plate removably secured to the building roof, said base plate having an upper planar surface and a lower planar surface;

a standoff comprising an elongated housing which extends outwardly away from said roof and presents a bottom planar surface being removably secured to said roof, a top planar surface parallel to and remote from said bottom planar surface;

a mounting plate presenting a radially extending planar mounting surface said mounting surface being parallel to and spaced from said top planar surface and further being removably secured to said top planar surface;

at least one gusset fixedly attached to said structure and extending radially therefrom, said gusset further being fixedly attached to said mounting plate;

an upper housing extension that projects upwardly from said mounting plate;

wherein said mounting surface and said top planar surface are adapted to receive a first locking device for removably securing said mounting surface to said top planar surface; and wherein said roof, said base plate, and said bottom planar surface are adapted to receive a second locking device.

2. The device of claim 1, wherein the structure is adapted to receive said upper housing extension.

3. The device of claim 1, wherein said standoff further comprises a lower housing extension that projects downwardly from said bottom planar surface through an aperture in said base plate and said roof.

4. The device of claim 1, wherein said first locking device comprises a plurality of bolts.

5. The device of claim 1, wherein said second locking device comprises a plurality of bolts.

6. The device of claim 1, wherein said upper housing extension is conical.

7. The device of claim 1, further including at least one gusset fixedly attached to said standoff and extending vertically from said base plate to said top planar surface.

8. The device of claim 1, wherein said upper housing extension projects from the center of and is rigid with said mounting plate.

9. The device of claim 8, wherein said upper housing extension is generally frustoconical in shape.

* * * * *